(12) United States Patent
Aijaz (10) Patent No.: US 11,676,492 B2
(45) Date of Patent: Jun. 13, 2023

(54) SYSTEM AND METHOD FOR COOPERATIVE ROBOTICS

(71) Applicant: Kabushiki Kaisha Toshiba, Minato-ku (JP)

(72) Inventor: Adnan Aijaz, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 263 days.

(21) Appl. No.: 16/557,586

(22) Filed: Aug. 30, 2019

(65) Prior Publication Data

US 2021/0065556 A1 Mar. 4, 2021

(51) Int. Cl.
  *G08G 1/00* (2006.01)
  *G05D 1/02* (2020.01)
  *G05D 1/00* (2006.01)

(52) U.S. Cl.
  CPC ............ *G08G 1/22* (2013.01); *G05D 1/0088* (2013.01); *G05D 1/0223* (2013.01)

(58) Field of Classification Search
  None
  See application file for complete search history.

(56) References Cited

U.S. PATENT DOCUMENTS

| | | | | |
|---|---|---|---|---|
| 10,960,544 | B2* | 3/2021 | Kaminka | G05D 1/0088 |
| 2010/0256836 | A1* | 10/2010 | Mudalige | G08G 1/164 |
| | | | | 701/25 |
| 2014/0228999 | A1 | 8/2014 | D'Andrea et al. | |
| 2015/0239580 | A1* | 8/2015 | Valenzuela | B66F 9/063 |
| | | | | 701/50 |
| 2017/0344023 | A1* | 11/2017 | Laubinger | G08G 1/22 |
| 2018/0084242 | A1* | 3/2018 | Rublee | G06V 20/20 |
| 2018/0302908 | A1* | 10/2018 | Aijaz | H04L 45/28 |
| 2019/0200519 | A1* | 7/2019 | Chrysanthakopoulos | |
| | | | | A01M 21/04 |
| 2019/0212725 | A1* | 7/2019 | Woodrow | G05D 1/0011 |

(Continued)

FOREIGN PATENT DOCUMENTS

DE 102019202558 A1 * 8/2020

OTHER PUBLICATIONS

Digon,2015, Wikipedia (Year: 2015).*

(Continued)

*Primary Examiner* — Jelani A Smith
*Assistant Examiner* — Davin Seol
(74) *Attorney, Agent, or Firm* — Oblon, McClelland, Maier & Neustadt, L.L.P.

(57) ABSTRACT

A method performed in a system comprising a plurality of autonomous vehicles. The method comprises a first vehicle transmitting a geometric configuration information to be adopted by one or more other vehicles participating in a transport operation in combination with the first vehicle, wherein the geometric configuration information comprises information regarding respective distances and orientations the one or more other vehicles are required to adopt relative to the first vehicle, a second vehicle, upon receipt of the geometric configuration information, adopting a position relative to the first vehicle or to a further vehicle participating in the transport operation, the position of the second vehicle defined by the geometric configuration information and the first and second vehicles performing a transport operation in a synchronised manner once the second vehicle has adopted said position.

23 Claims, 7 Drawing Sheets

Triangle

Diamond

Hexagon

Line (56) References Cited

U.S. PATENT DOCUMENTS

| | | | |
|---|---|---|---|
| 2019/0310625 A1* | 10/2019 | Cremona | G08G 1/22 |
| 2019/0383625 A1* | 12/2019 | Oswald | B61L 15/0045 |
| 2020/0057453 A1* | 2/2020 | Laws | G08G 1/22 |
| 2020/0135032 A1* | 4/2020 | Switkes | H04W 4/029 |
| 2020/0250991 A1* | 8/2020 | Kallenbach | G08G 1/22 |
| 2020/0396782 A1* | 12/2020 | Russell | H04L 67/12 |
| 2021/0039265 A1* | 2/2021 | Nam | B25J 9/162 |
| 2021/0157323 A1* | 5/2021 | Zhong | G01S 3/46 |
| 2021/0173411 A1* | 6/2021 | Rao | G08G 1/22 |
| 2022/0024738 A1* | 1/2022 | Le Polotec | B66F 9/063 |

OTHER PUBLICATIONS

Bassem Hichri, Lounis Adouane, Jean-Christophe Fauroux, Youcef Mezouar, Y Doroftei, Cooperative Lifting and Transport by a Group of Mobile Robots, International Symposium on Distributed Autonomous Robotic Systems, 2018, pp. 1-15 (Year: 2018).*

Mesh Working Group, Bluetooth SIG, Mesh Profile, Version 1.0, Jul. 13, 2017, 331 pages.

* cited by examiner

Robots receive task information

Best-fit robot is elected as the leader

Leader recruits followers for the task

SYSTEM AND METHOD FOR COOPERATIVE ROBOTICS

FIELD

Embodiments described herein relate generally to distributed transport and more particularly to information exchange between members of a group of devices participating in distributed transport.

BACKGROUND

Future industrial systems are projected to encompass enhanced automation and increased penetration of mobile robots. The logistic sector is already employing mobile robots, particularly in warehouse and container terminals. Current industrial applications are mostly focused on a single mobile robot.

The use of multiple mobile robots or a network of mobile robots, acting in a collaborative/cooperative manner, improves efficiency and performance of industrial operations. Moreover, it creates new opportunities for automation processes targeting complex manipulative tasks. Cooperative robotics is also attractive from an economic perspective as multiple identical robots can be used (for transporting different sized objects) which are cheaper to produce and maintain as compared to different-sized robots which are used in various state-of-the-art warehouse applications.

Arrangements of the embodiments will be understood and appreciated more fully from the following detailed description, made by way of example only and taken in conjunction with drawings in which.

DETAILED DESCRIPTION

According to an embodiment there is provided a method performed in a system comprising a plurality of autonomous vehicles. The method comprises a first vehicle transmitting a geometric configuration information to be adopted by one or more other vehicles participating in a transport operation in combination with the first vehicle, wherein the geometric configuration information comprises information regarding respective distances and orientations the one or more other vehicles are required to adopt relative to the first vehicle, a second vehicle, upon receipt of the geometric configuration information, adopting a position relative to the first vehicle or to a further vehicle participating in the transport operation, the position of the second vehicle defined by the geometric configuration information and the first and second vehicles performing a transport operation in a synchronised manner once the second vehicle has adopted said position.

The first and second vehicle may perform the transport operation in response to the first vehicle sending a triggering signal to start the transport operation.

In an embodiment the one or more vehicles, upon receipt of the geometric configuration information, return information indicating one or more of: a distance of the individual vehicle to each location identified in the geometric configuration information or an amount of energy available to the vehicle. The first vehicle assigns an individual one of the further vehicles to each said location based on said returned information.

In an embodiment the second vehicle, upon receipt of said geometric configuration information, assign itself to a location identified in the geometric configuration information based on at least one of: a distance of the second vehicle to the location, an amount of energy available to the vehicle or an estimated amount of energy required for the transport operation.

In an embodiment throughout the transport operation the first vehicle transmits movement information to other vehicles participating in the transport information indicating a next movement required to be performed by the other vehicles. The movement information is such that relative positions of the vehicles participating in the transport operations are maintained whilst the vehicles perform the next movement.

In an embodiment the movement information comprises a velocity to be adopted by the vehicles and wherein the vehicles feed a current velocity back to the first vehicle.

In an embodiment the one or more of the vehicles participating in the transport operation comprise a sensor or sensors for sensing one or more environmental conditions and a transmit function for communicating a sensed environmental condition to other vehicles participating in the transport operation.

In an embodiment the first vehicle stops or pauses the transport operation upon receipt of information from a vehicle participating in the transport operation indicating an environmental condition detrimental to continuing the transport operation.

In an embodiment, upon receipt of information indicating that a vehicle that had previously participated in the transport operation is not able to complete said transport operation, said first vehicle either instructs remaining vehicles participating in the transport operation to adopt a geometric configuration suitable for completion of the transport operation and requiring a reduced number of vehicles or recruit a replacement vehicle for participation in the transport operation.

In an embodiment the vehicles participating in the transport operation communicate using a transmission schedule consisting of timeslots on distinct frequency channels based on handshakes between the first vehicle and the vehicles participating in the transport operation.

The first vehicle may assign priorities for requesting timeslots on distinct frequency channels to the other vehicles participating in the transport operation.

The first vehicle may assign one or more timeslots on a distinct frequency channel for communication with all follower vehicles.

A vehicle participating in the transport operation may request one or more timeslots on a distinct frequency channel for communication with the first vehicle or another vehicle of the vehicles participating in the transport operation, with the first vehicle confirming the request only if it does not find another vehicle participating in the transport operation and using the same timeslot on the same frequency channel.

The assigned timeslot of the transmission schedule may be used by the vehicle participating in the transport operation to report at least one of a distance from the first vehicle or from another vehicle participating in the transport operation or a battery level.

In an embodiment a vehicle participating in the transport operation selects another vehicle participating in the transport operation as a reference vehicle for maintaining a formation indicated by the geometric configuration information, wherein the selection is based on information received from other vehicles participating in said transport operation.

The vehicles in the system may have identical size and/or lifting ability or may be differently sized or have different lifting ability.

The vehicles may be earth bound based robots, drones, cooperative robots or automatic guided vehicles. The vehicles may operate in a warehouse or other logistics environment.

In an embodiment there is provided a system comprising a plurality of autonomous vehicles. The system comprising a first vehicle configured to transmit geometric configuration information to be adopted by one or more other vehicles participating in a transport operation in combination with the first vehicle, wherein the geometric configuration information comprises information regarding respective distances and orientations the one or more other vehicles are required to adopt relative to the first vehicle, a second vehicle configured to, upon receipt of the geometric configuration information, adopt a position relative to the first vehicle or to a further vehicle participating in the transport operation, the position of the second vehicle defined by the geometric configuration information and the first vehicle and the second vehicle configured to performing a transport operation in a synchronised manner once the second vehicle has adopted said position.

In another embodiment there is provided an autonomous vehicle configured to transmit geometric configuration information to be adopted by one or more other vehicles participating in a transport operation in combination with the autonomous vehicle, wherein the geometric configuration information comprises information regarding respective distances and orientations the one or more other vehicles are required to adopt relative to the first vehicle.

In another embodiment there is provided computer program instructions for execution by a processor, the computer program instructions configured to cause the processor, when executing the computer program instructions, to perform any of the methods described herein, be that a method performed by the entire system or a method performed by an individual component or vehicle of the system.

Mobile robots play an important role in various industrial applications. The logistic sector, for example, is using mobile robots, for example in warehouses and container terminals. Existing applications are based on the use of a single robot. The use of multiple mobile robots or a network of mobile robots in embodiments, acting in a collaborative/cooperative manner, provides various performance enhancements and benefits. The problem of collaboratively transporting an object, also referred to as the collective transport problem, involves synthesis/formation of an appropriate geometric pattern for efficiently carrying the object. Moreover, this pattern should be maintained while transporting the object from one point to another. The framework disclosed herein leverages local sensing capabilities and ultra-low latency wireless communication for efficient formation synthesis and control. The proposed framework is completely distributed in nature and does not rely on a global coordinate system for mobile robots. It displays generality in terms of produced geometric formations and ensures stability of formation from any initial states. It also provides necessary formation robustness for operation in dynamic environments characterized by the presence of obstacles.

The problem of collaboratively transporting an object, also referred to as the collective transport problem, involves synthesis/formation of an appropriate geometric pattern for efficiently carrying the object. Moreover, this pattern must be maintained while transporting the object from one point to another.

Existing techniques for pattern formation often rely on complex sensory capabilities and control designs, and may not take into account the possibility of information exchange among robots. Ultra-low latency wireless communication can improve the convergence time of synthesizing a formation as well as reconfiguration time of the formation of mobile robots. Protocols that achieve ultra-low latency are described herein. Moreover, it also reduces sensory and processing overhead, which is particularly attractive for minimizing energy consumption of battery-operated robots.

The framework disclosed herein leverages local sensing capabilities, such as, for example, capabilities provided by the use of cameras, UWB sensors (although embodiments may comprise all other suitable means of sensing a part of an environment local to the vehicle), and ultra-low latency wireless communication for efficient formation synthesis and control. The disclosed framework is completely distributed in nature and does not rely on a global coordinate system to allow mobile robots to synthesise a given formation. This said, each robot/vehicle is aware of a reference direction (for example North) that is the same for all robots in the system. Embodiments are not limited in terms of the geometric formations that can be produced. Geometric formations can be stably maintained irrespective of the formation and/or the initial states of the robots. Embodiments also provide desired formation robustness for operation in dynamic environments characterized by the presence of obstacles. In embodiments obstacles are dealt with in various ways. One way is to stop the formation in case a moving obstacle comes on the way (e.g., a human or another robot). This is achieved through an emergency message leveraging group communication capabilities. For static obstacles, the formation may be reconfigured to a formation that can move around the obstacle.

Figure 1:
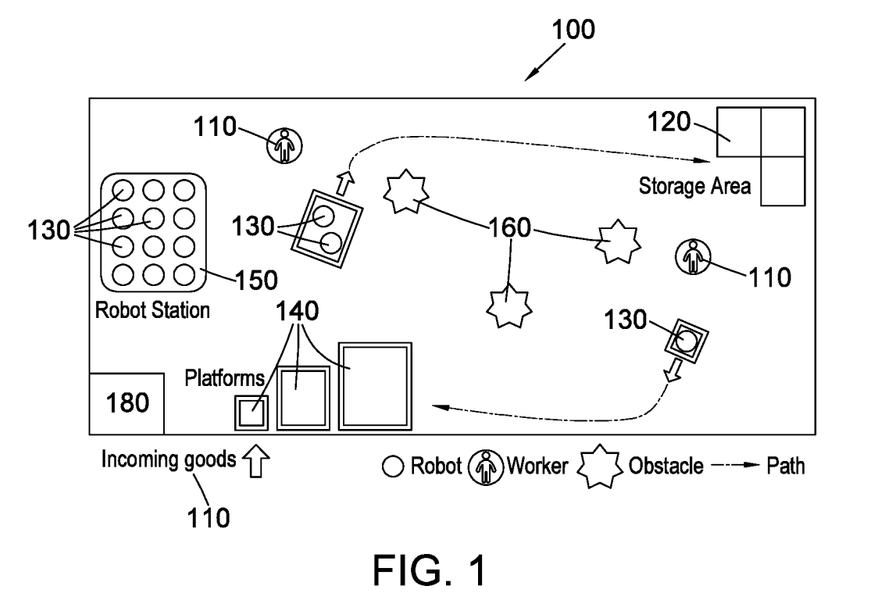
FIG. 1 shows a warehousing environment in which the present system can be operated.

A warehouse 100 with plurality of mobile robots and platforms/pallets (in which inventory items are placed) and in which embodiments can be used is shown in FIG. 1. Goods may be received at an incoming goods entry 110. To store the goods, they are to be transported to a storage area

120. It will be appreciated that this storage area 120 may be in any part of the warehouse 100 or may indeed cover the entire warehouse 100. A plurality of robots 130 are provided to transport platforms 140 on which goods to be transported may be arranged form the incoming good section 110 to the storage area 120. The platforms 140 are provided in different sizes to accommodate different sizes of goods or different quantities thereof. When not active the robots may be stored in a robot station 150. The station may comprise a charging facility that allows the robots to re-charge a battery needed for their operation. A plurality of obstacles 160 may be present within the warehouse 100 and human workers 170 may also occupy space within it. The obstacles 160 and workers 170 need to be taken into account and avoided when the robots 130 navigate the warehouse 100. Further detail of the system are provided in a further US patent application with the title "A system and method for transporting inventory items in logistic facilities" filed on the same date as the present document and incorporated herein by reference in its entirety.

The objective is to transport inventory items from one point within the warehouse 100 to another point within the warehouse 100 using a single or multiple robots 130. Some of the platforms 140 carrying such inventory items may be of a nature that allows them being carried by a single robot 130. Other platforms 140 in contrast can only be carried by multiple robots 130, be that because of their size or their weight or a combination of both. The embodiment provides a means of coordination among multiple robots 130 to allow transport of platforms 140 also in the later scenario. A central control unit 180 is provided for controlling the operation of robots 130.

Figure 2:
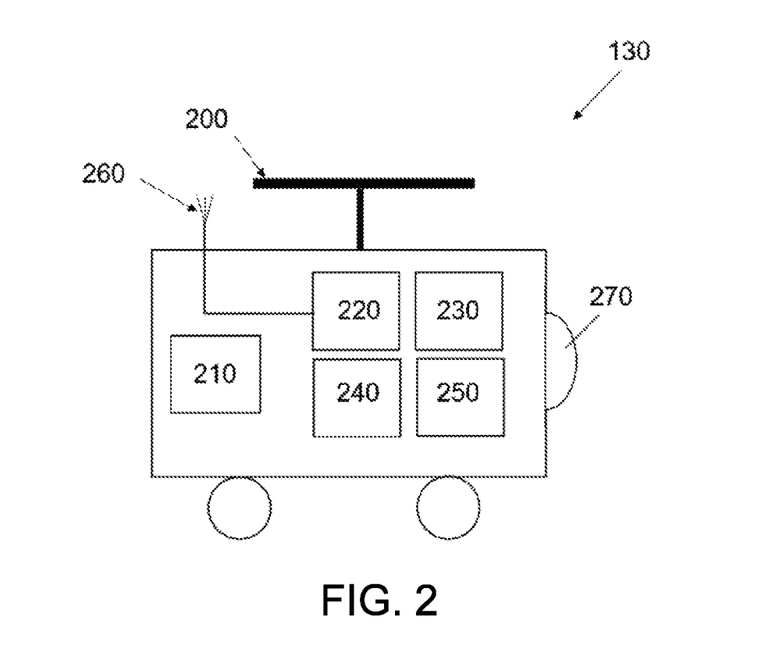
FIG. 2 shows an example of a transport robot.

FIG. 2 shows an example of a robot. In the embodiment each robot 130 has a holonomic drive 210 and a vertically extendable lifting platform 200 on its top surface. The holonomic drive 210 controls the movement of the robot 130, for example, as it moves within the warehouse 100. The lifting platform 200 is configured to engage with a lifting location of the platform 140 during a lift operation.

Each robot 130 further comprises a wireless input/output port 220 connected to an antenna 260 to transmit and receive signals. The robot 130 may receive a signal from a control system covering the warehouse, such as a signal specifying a lifting position under the platform 140. The robot 130 may transmit a signal to the control system, such as a signal indicating that a load experienced by the robot 130 during a lift operation is too big. In other embodiments, the robot 130 may receive or transmit signals to and from other robots 130.

Each robot 130 further comprises a microprocessor 230 and a non-volatile memory 240. The processor 230 is configured to execute instructions received from the control system, or another robot 130. The processor 230 is also configured to execute instructions stored in the non-volatile memory 240. Execution of these instructions causes the robot 130 to perform some of the method steps described herein. For example, execution of the instructions may cause a control module 250 in conjunction with the holonomic drive 210 to move the robot 130 to a desired location within the warehouse 100. The robot 130 further comprises sensors 270 that allow it to sense its environment, in particular obstacles and human workers, under the control of the processor 230. Multiple different sensors, including image generating sensors such as cameras and infrared sensors may be provided. In the embodiment the processor is configured to perform multi-sensory data fusion to derive different types of information, such as distances between objects or distances of objects from the robot, orientation of the robot within its environment or relative to elements of the environment, etc. The use of such sensors and data processing eliminates the need for a global coordinate system for the robots 130. Each robot 130 is moreover associated with a unique ID for wireless communication.

Figure 3:
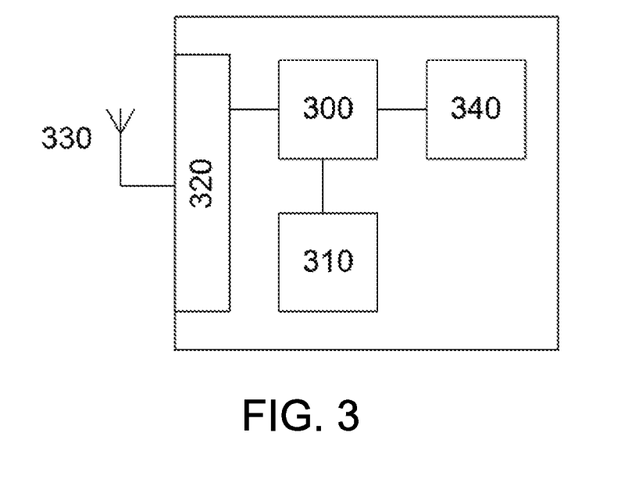
FIG. 3 shows and example of a central control unit.

FIG. 3 shows an example of a central processing unit 180. The unit comprises a processor 300 in communicative connection with non-volatile memory 310. Non-volatile memory 320 stores computer program instructions that, when executed, by the processor 300, cause the processor to perform the control functions of the central processing unit 180 described herein. The processor 300 is further incommunicative connection with a wireless input/output unit 320 that allows the processor to establish wireless communication connections with other elements within the warehouse, such as robots 130, using antenna 330. Additionally the controller 300 may wirelessly receive information from sensors or scanners, for example a scanner that allow an operator to identify a platform 140 that has been loaded with newly arrived goods that need to be stored in the warehouse. The central processing unit 180 further comprises, in one embodiment, a user interface 340 that allows the user to input further information, such as a type of goods loaded on identified platforms 140, platform identifiers, locations to which a platform 140 is to be transported or retrieved from within the warehouse, etc.

Figure 4A:
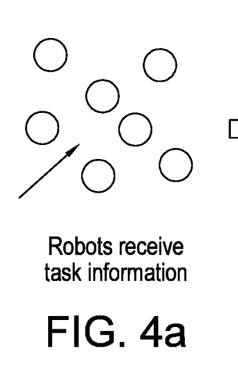
FIG. 4a) illustrates the communication of task information to a group of robots.

Discussing the individual steps in in realizing collective transport in more detail, task information is transmitted from the central control unit 180 to the robots (as illustrated FIG. 4a)). Such task information may specify a particular task to be performed by a number of robots, say moving an inventory item from one location to another. The task information may include any orders, data, instructions, commands or information structured in any appropriate form for the robots to interpret in a manner that allows them to perform their tasks. The central control unit 180 maintains task requests and disseminates this information to the robots in the form of a system-wide broadcast. Alternatively, robots maintain status of platforms and task requests in a shared distributed database, which is continuously updated in real-time based on sensory inputs of different robots.

Figure 4B:
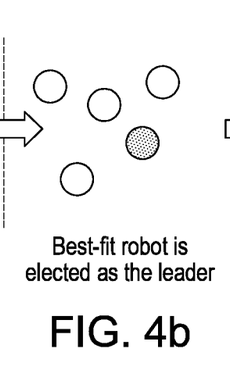
FIG. 4b) illustrates the election of a leader from among the group of robots.

The robots 130 can be in different states at different time, including two baseline states: IDLE and BUSY. A robot 130 in the BUSY state is already involved in transportation of inventory items or charging its battery, and therefore, it is not available for new tasks. After receiving the task information, the IDLE robots 130 in the system engage in a leader election process, as illustrated in FIG. 4b). A leader is the best-fit robot 130 among the IDLE robots 130 based on any system-level metric. In an embodiment the robots use multi-hop mesh communication so that the robots/vehicles in the system are aware of location and battery status information transmitted by fellow robots/vehicles. On the basis of this information individual robots/vehicles can determine whether or not they should designate themselves as leader robot and are configured to do so in the event of a positive determination.

Figure 5:
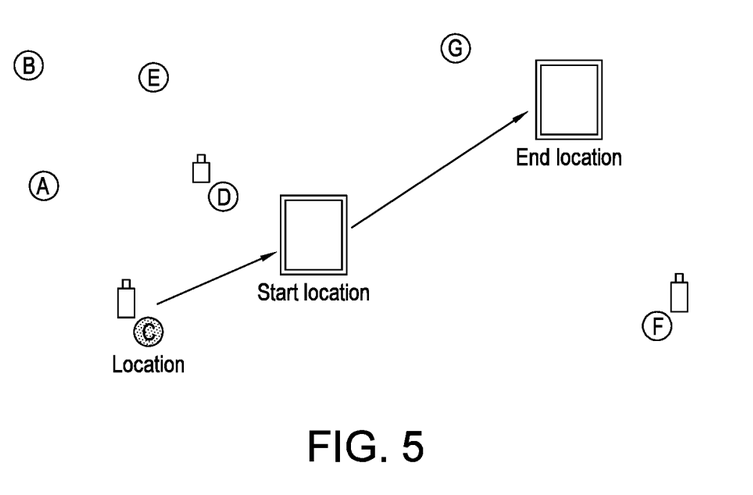
FIG. 5 illustrates selection of a leader based on geometric and battery charge considerations.

In one embodiment, the leader robot L is the one which is closest to the start location of the task. However, moving inventory items across logistic facilities consumes energy. Moreover, the leader robot would be engaged in coordinating the formation. Hence, in an alternative embodiment, the leader robot is the one with the maximum battery lifetime. In a yet alternative embodiment, the leader robot is selected through an optimization problem that ensures task delivery with maximum battery lifetime subject to a minimum distance constraint. FIG. 5 further elaborates on leader election based on distance and energy constraints. For the sake of illustration, three robots 130 are considered in the leader election, robots C, D and F. Robots C and F have the same battery charge. Robot D has a lower battery charge than robots C and F. Although robot D is closer to the platform to be transported, robot C is elected as a leader as it has a higher battery level.

Figure 4C:
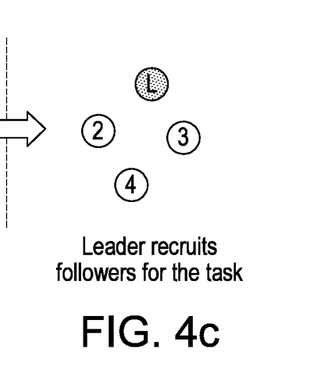
FIG. 4c) illustrates the recruitment of followers following leader selection.

Once a leader has been elected, it recruits followers for completing the task as illustrated in FIG. 4c). If the platform/pallet can be handled with a single robot only, the leader completes the task itself. If the platform/pallet requires multiple robots, the leader broadcasts/advertises a ROBOTS_REQ message for recruiting followers. After receiving the ROBOTS_REQ message, robots volunteer for the task. In one embodiment, robots volunteer based on their distance from the start location of the task. In a second embodiment, followers volunteer for the task by taking into account the required energy consumption of the task. The exact number of required followers depends on the desired formation for collective transport. Follower selection is illustrated in FIG. 4c).

Figure 6:
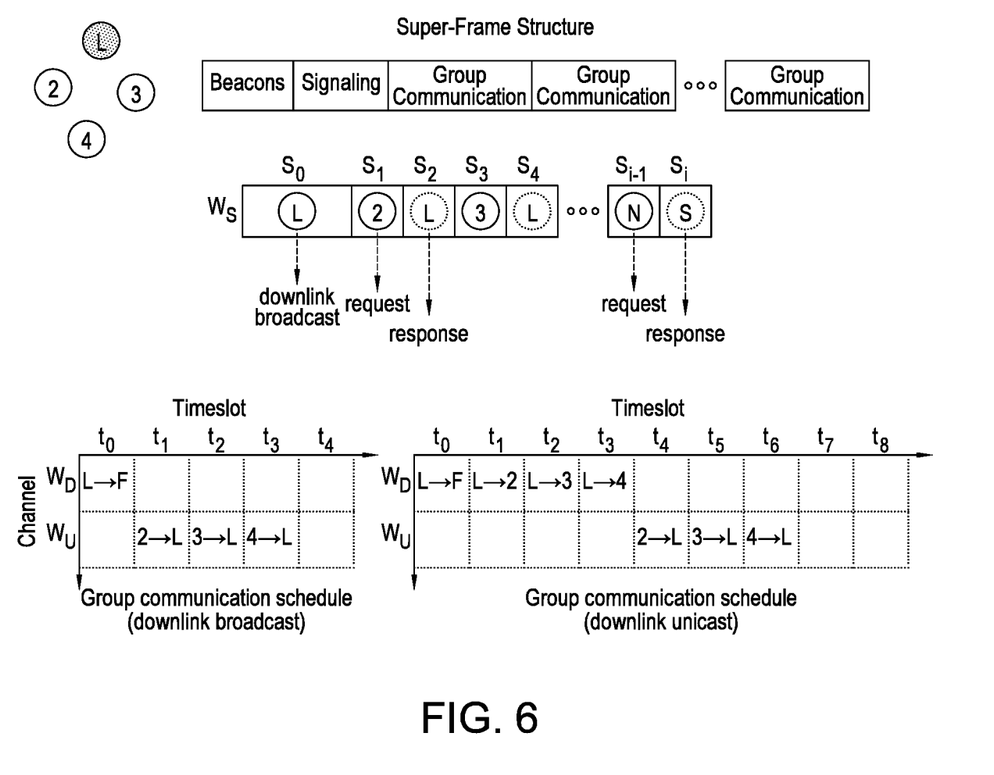
FIG. 6 show a signalling procedure for collective transport group communication.

The formation synthesis and control requires group-based communication between the leader and the follower robots. This communication has to take place locally as multiple formations can be operating in parallel in different parts of the facility. In the proposed framework, robots taking part in the collective transport build a distributed schedule for group-based communication in the formation. The procedure for building a distributed schedule is shown in FIG. 6. The super-frame consists of three distinct frames: beacon frame, signalling frame, and group-communication frame(s).

Initially, the leader robot and the follower robots are time synchronized. Each robot maintains a local timer, which are periodically synchronized through beacons received from the leader. This is achieved in the beacon frame.

The signalling frame, $W_s$, which consists of a fixed number of timeslots on a specific frequency channel, is used for information exchange regarding schedule construction. The first signalling slot $S_0$ is used by the leader to broadcast some schedule-related information. In order to build a schedule without contention, the downlink information contains information regarding the priorities for the follower robots. The leader robot is configured to randomly assign priorities to the follower robots. Following the downlink slot, there is a repetitive pattern of two timeslots, first for a follower robot to request resources (timeslots on distinct frequency channels) from the leader robot and the second for the leader to confirm the requested allocation. Such a leader-follower handshake ensures conflict-free schedule construction for group communication.

In one embodiment, the group communication consists of downlink communication from the leader robot to all followers in a broadcast fashion and uplink communication from each follower to the leader in a unicast fashion. In this case, a schedule is built for one-to-many (downlink) and many-to-one (uplink) communication. For the sake of illustration, robots with lower IDs are treated as having a higher priority. The downlink information from the leader informs followers of the next available slot for requesting resources. The follower robots use their priority information to determine their timeslot for requesting resources. For the downlink broadcast scenario, the leader selects the first available timeslot (t0) on the downlink channel for broadcast information. Each follower robot selects a timeslot which is free as per its local knowledge. For instance, the robot with ID number 2 requests timeslot t1 on the uplink channel when rending a request message in signalling slot s1. The leader confirms the requested allocation (if and as this slot is not used by any other robot) by sending a response message in signalling slot s2. The robots with ID numbers 3 and 4 follow a similar procedure and get allocated timeslots t2 and t3, respectively. For the downlink unicast scenario, the leader selects timeslots t0-t3, with t0 dedicated for any broadcast information, and t1-t3 dedicated for communication with the robots with ID numbers 2-4, respectively.

Figure 7:
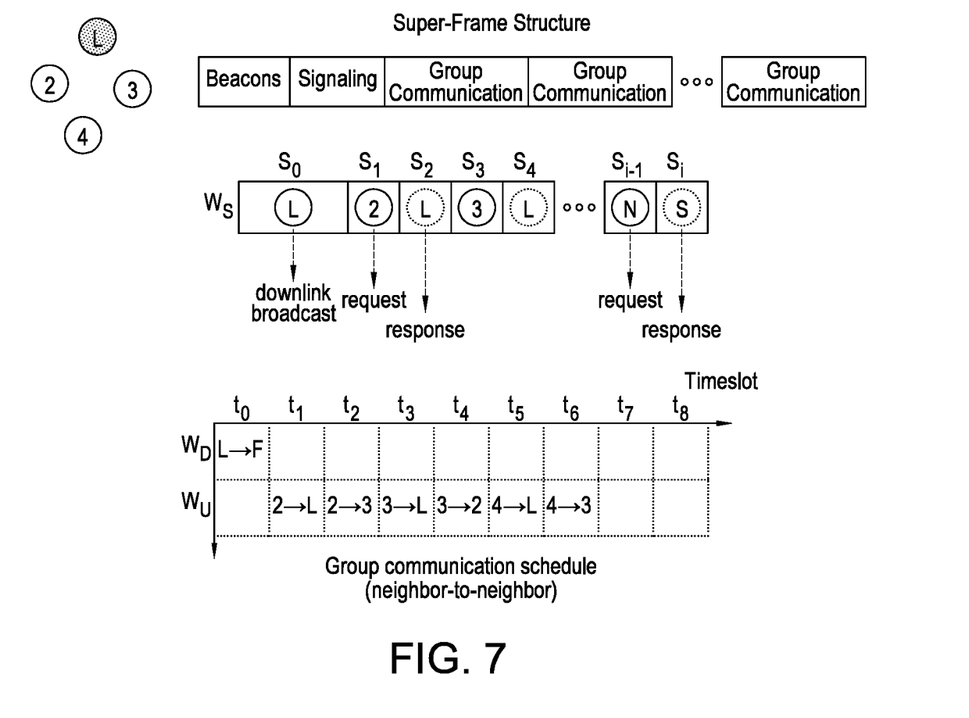
FIG. 7 illustrates show a signalling procedure for collective transport group communication incorporating neighbour to neighbour signal exchange.

In an alternative embodiment, group communication consists of downlink communication (in broadcast or unicast manner) and uplink communication between the leader and the followers as well as neighbour-to-neighbour information exchange among follower robots. The schedule building process takes places through the aforementioned signalling. However, in this case, follower robots request at least one extra timeslot for communication with at least one neighbouring follower robot, which is referred to as the friend/relay robot and assists the follower robot during formation synthesis and control. This embodiment is illustrated in FIG. 7. The schedule only needs to be constructed once for a given task of collective transport. Hence, group communication for the formation can continue in a cyclic fashion from beginning of the task to the end of task. The group communication procedure can be triggered once the leader and all the followers are in the vicinity of the platform to be transported after leader election and follower selection process is complete. The leader and followers can be in different parts of the facility; however, they are aware of the location of the platform. Hence, they can independently traverse toward the platform for formation synthesis.

Figure 8:
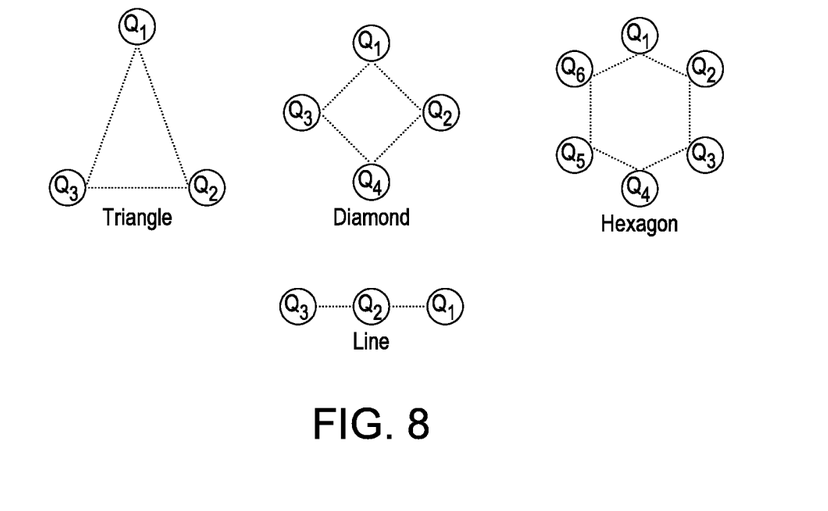
FIG. 8 illustrates examples of different geometric formations.

The robots 130 are configured to arrange themselves into one of plurality of geometric patterns under a platform that is to be lifted, as required for the transport task that is to be performed. Each geometric pattern is characterized by a fixed number of positions, as shown in FIG. 8. The required geometric pattern may be communicated to the robots as part of the task information. Alternatively one of the robots, for example the lead robot, may determine the nature/type of the platform to be transported, for example by detecting a unique identifier, such as a QR code or barcode of the platform using its sensors, and deducing from this identifier the formation to be adopted by the robots. Further alternatively or additionally, robots may determine a new formation to be adopted following an unsuccessful attempt to transport a platform. This may happen if an initially determined number of robots in an initial formation do no manage to transport the platform, for example because the group of robots cannot lift the total weight of the platform or because the initially adopted formation does not take into account an unbalanced load.

Figure 9:
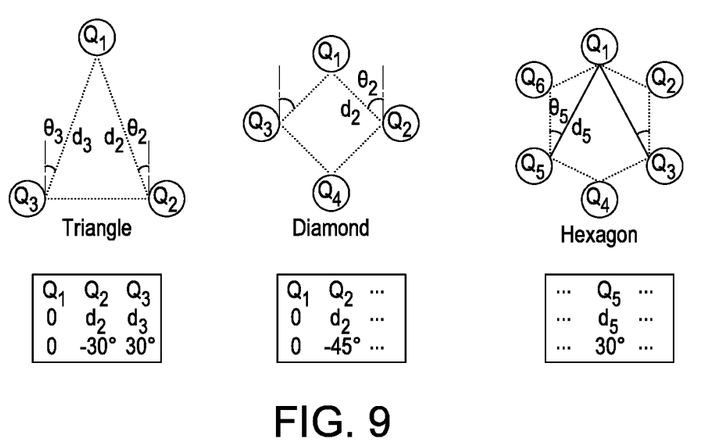
FIG. 9 illustrates examples of geometry matrices for different geometric formations.

An objective of the mapping procedure is to allocate robots to different positions pertaining to the formation. In order to realize robot-to-position mapping, the leader robot first generates a geometry matrix for the formation to be formed. The exact geometric shape to be formed depends on the platform to be moved and its load distribution. The leader robot broadcasts the geometry matrix (illustrated in FIG. 9) to all the follower robots in the downlink. One way to realize the geometry matrix is $$Q_1 \quad Q_2 \quad Q_3 \quad \ldots \quad Q_N \quad\quad (1)$$
$$0 \quad d_2 \quad d_3 \quad \ldots \quad d_N$$
$$0 \quad \theta_2 \quad \theta_3 \quad \ldots \quad \theta_N$$

where each column refers to a position of the shape to be formed, with first row of each column containing the position, the second row of each column containing the distance and the third row of each column containing the orientation information. The distance and orientation information are in reference to the leader robot, which would be occupying the first position.

In one embodiment, the mapping procedure is performed by the leader robot based on the feedback from the follower robots. The key steps of this mapping procedure (illustrated in FIG. 10) are described as follows.

Figure 10:
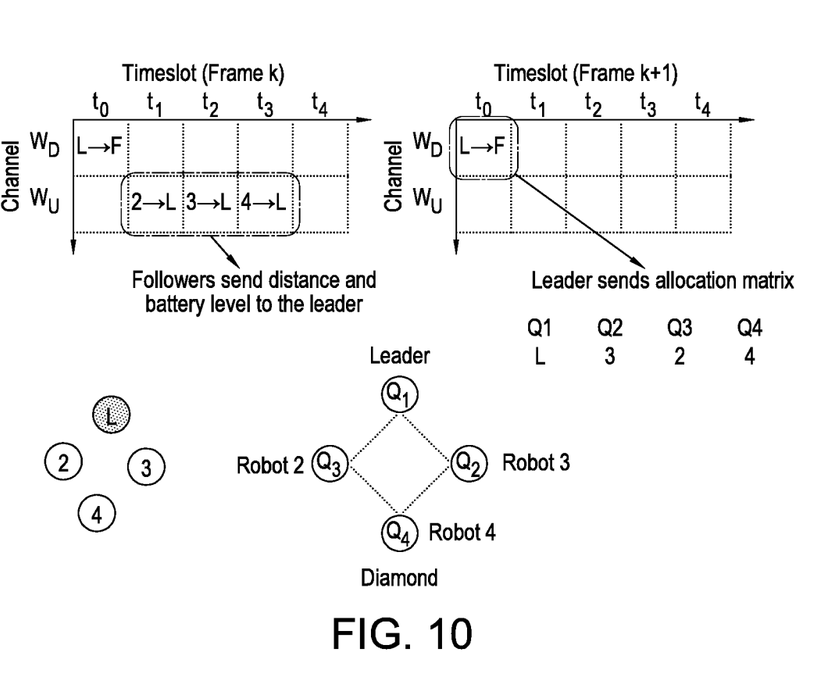
FIG. 10 illustrates mapping generate by the leader robot.

1. Leader robot broadcasts the geometry matrix (such as the matrix (1) above) to be adopted by the robots to the follower robots. This broadcast excludes details of the positions to be adopted by specific individual robots.
2. Each follower robot measures its distance from each position of the geometry matrix. The distance of the $i^{th}$ follower robot from the $j^{th}$ position is denoted by $H_{i,j}$.
3. Each follower robot transmits $H_{i,j}$ along with its remaining battery level to the leader robot in its assigned uplink timeslot.
4. The leader robot finds the best position for each robot in terms of minimal distance, or minimal energy consumption (for task completion) or minimum cost jointly determined by distance and energy consumption (for task completion).
5. The leader robot creates and broadcasts an allocation matrix, which indicates robot-to-position mapping information as shown below where the second row indicates the robot.

$$\begin{array}{ccccc} Q_1 & Q_2 & Q_3 & \ldots & Q_N \\ L & 3 & 4 & \ldots & K \end{array} \quad (1)$$

In another embodiment, the follower robots negotiate their position in the shape to be formed through local information exchange. Steps in this mapping procedure are:
1. The leader robot broadcasts the desired geometry matrix (such as the matrix (1) above) to be adopted to the follower robots in the downlink. This broadcast excludes details of the positions to be adopted by specific individual robots. The leader robot also informs robots that the first position is not available for negotiation.
2. Each follower robot measures its distance from all available positions and sends a negotiation start (NEG_START) message to all the robots in its assigned timeslot.
3. Each follower robot listens to the NEG_START messages of other robots.
4. At the end of the communication cycle, each follower robot knows the distance of other follower robots from each position of the shape to be formed.
5. Each follower robot assigns itself the position with the smallest distance and communicates this to other follower robots through a negotiation end (NEG_END) message during its assigned timeslot on the next uplink cycle. The NEG_END message contains an instance of the allocation matrix indicating the position filled by the robot.

In another embodiment the above mentioned procedure is executed with energy consumption metric or a cost function jointly determined by distance and energy consumption. The procedure is executed over multiple cycles if more than one robot qualifies for a specific position.

In an embodiment the formation is synthesized in a sequential manner. In an alternative embodiment the formation is synthesised in a parallel manner. In the former case, each position of the formation is filled in a sequential way whereas in the latter case, multiple positions of the formation can be filled simultaneously. During the synthesis process, robots can be leader-referenced or neighbour-referenced, or leader as well as neighbour-referenced. The synthesis process relies on a reference matrix which provides the information about the reference for each robot along with the distance and orientation information.

Figure 11:
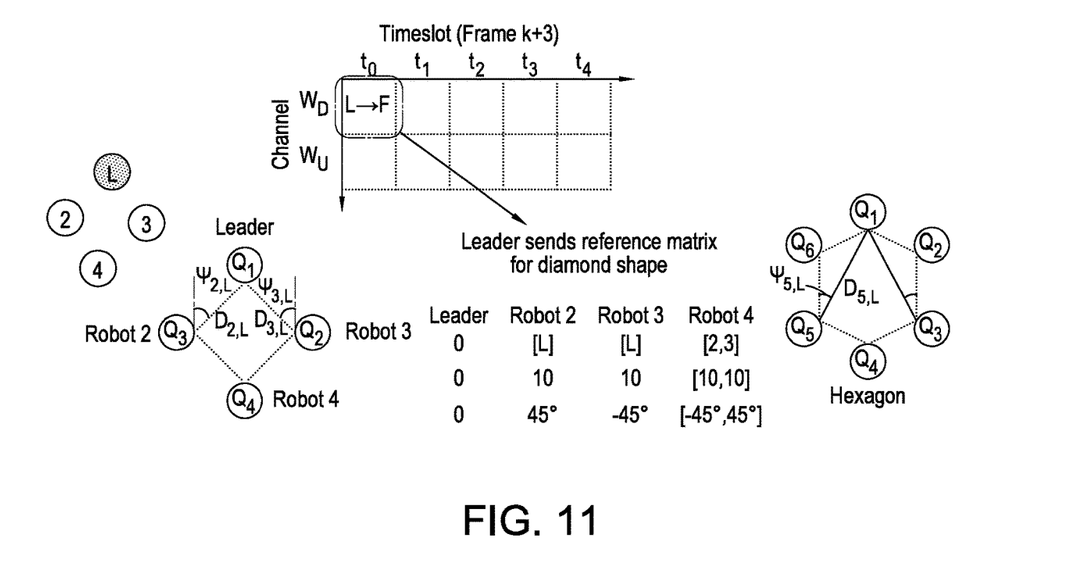
FIG. 11 illustrates a reference matrix generated by the leader robot.

In one embodiment, the reference matrix is derived a priori by the leader robot as shown in FIG. 11. One way to realize the reference matrix is shown below where each column refers to the robots engaged in collective transport. Further each column is a vector that contains the reference robots, the distance (denoted by D) and orientation information (denoted by $\psi$) for each robot.

| Leader | Robot 2 | ... | Robot N |
|--------|---------|-----|---------|
| [ ]    | [L]     | ... | [L]     |
| 0      | $D_2$   | ... | $D_{N,L}$ |
| 0      | $\psi_{2,L}$ | ... | $\psi_{N,L}$ |

Figure 12:
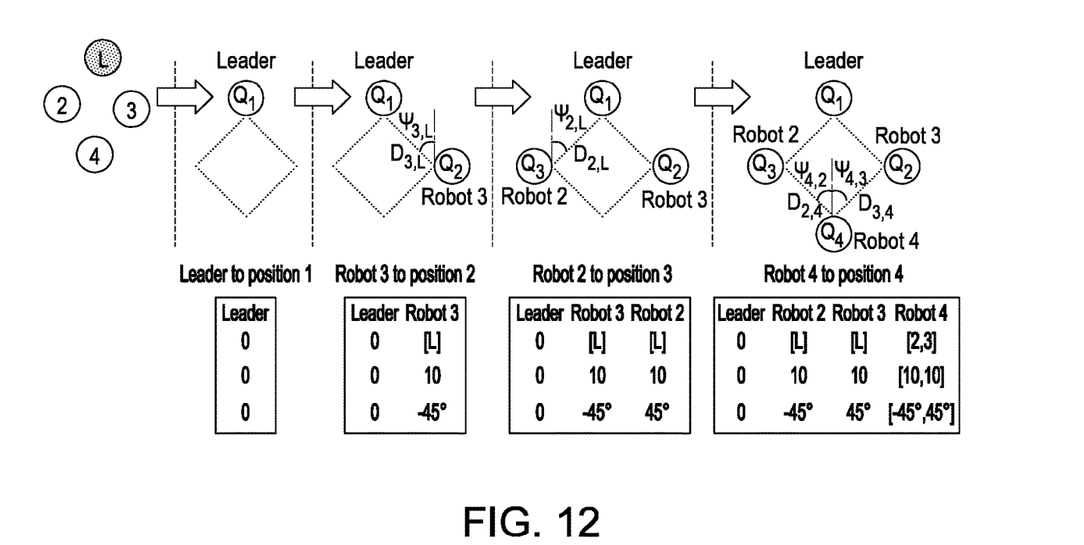
FIG. 12 illustrates subsequent reference matrices generated on the fly by the leader robot.

In another embodiment, the reference matrix is derived on-the-fly as shown in FIG. 12 for a diamond formation. The formation synthesis process begins with the leader robot moving towards the platform and aligning with a specific position, which becomes the first position of the formation. After aligning with the first position, the leader robot sends a position aligned (POS_ALGN) message to all the follower robots, as shown in FIG. 12. The POS_ALGN also contains a reference matrix with entries pertaining only to the leader robot, i.e., the first column.

Since robot 3 knows from the geometry matrix that it has to fill second position in the formation, it starts moving towards it after hearing the POS_ALGN message from the leader robot. It selects the leader robot as the reference and aligns itself in the second position at the desired distance and orientation. After alignment, robot 3 sends a POS_ALGN message to all robots engaged in formation synthesis. The POS_ALGN message also contains updated version of the reference matrix with entries pertaining to robot 3. Robot 2 follows a similar procedure after receiving the POS_ALGN message from robot 3 while referencing itself with respect to the leader and aligning with position 3 at the desired distance and orientation. After alignment, it sends the POS_ALGN to all robots with updated version of reference matrix including entries pertaining to itself. Finally, robot 4 needs to fill position 4 of the formation. It has the latest version of the reference matrix and knows that the leader as well as robots 2 and 3 have already aligned in their respective positions. Instead of referencing a distant robot, a robot gives preference to a closer robot (as a reference), if available. In this case, we assume that robot 4 is closer to robots 2 and 3. Hence, it references both robots 2 and 3 and aligns itself in position 4 at the desired position. After alignment, it sends a POS_ALGN message to all robots engaged in formation. Once the leader receives POS_ALGN messages from all follower robots, it sends a formation complete (FORM_CMPLT) message. The FORM_CMPLT message triggers the lifting mechanism at all robots. Lifting is performed synchronously to ensure that the platform is carried in a stable manner.

Figure 13:
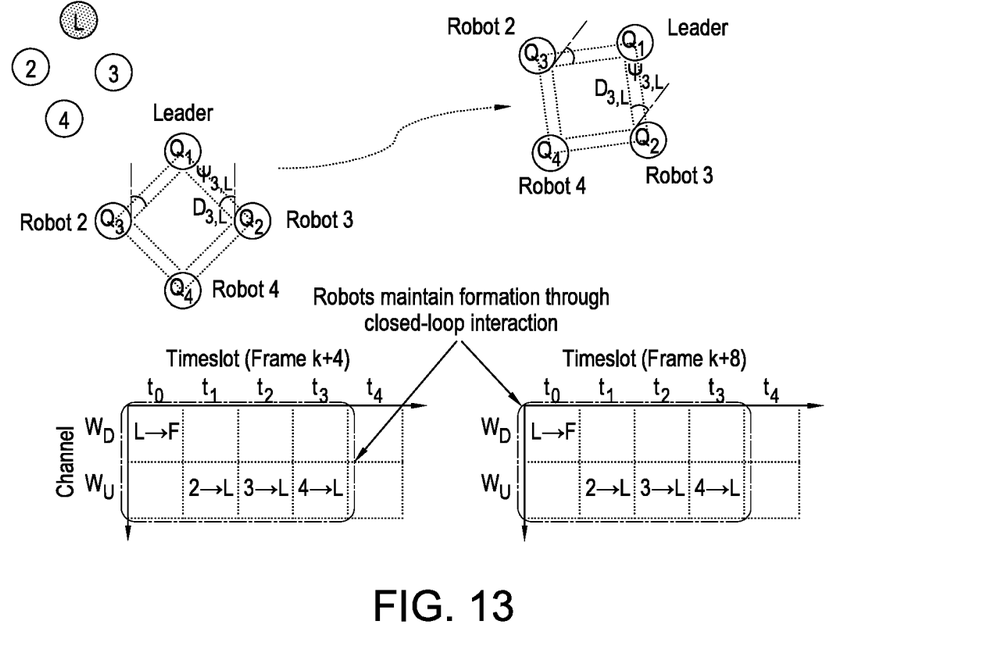
FIG. 13 illustrates a signalling process used in maintaining an adopted formation using closed loop interaction.

The synthesized formation needs to be maintained while the platform is being transported from one point to another. This is illustrated in FIG. 13. In one embodiment, only the leader robot is aware of the path that would be followed for transporting the object. For this purpose the robots maintain coupling/communication during movement, so that the formation moves smoothly as a unit which is particularly important for robots with on-holonomic drives. Such virtual coupling can be achieved through closed-loop interaction between the leader and the follower robots. The leader receives speed/velocity feedback from all follower robots in the uplink and sends a new speed/velocity for each follower if it is deviating (from leader's speed/velocity) by more than a certain threshold. In an embodiment the leader robot has the path information available as a set of reference points. In broadcasts the next reference point to all follower robots which compute the necessary speed/velocity correction (based on a kinematic model specific to the robot) for maintaining the required distance and orientation for a specific shape.

In another embodiment, the leader as well as all the follower robots have knowledge of the path for transporting the platform. In this case, follower robots maintain the required distance and orientation from the respective referenced robot(s). The leader as well as the follower robots periodically transmit a keep alive (K_ALIVE) message based on the schedule for group communication. The keep alive (K_ALIVE) message is a heartbeat message that may have an empty payload or comprise information pertaining to the robot (e.g., its remaining battery level).

The formation of robots may encounter obstacles during collective transport. It is important that the formation stops as a whole if any obstacle is detected by any of the robots. Timely delivery of such event-based control can also be achieved through the underlying group communication schedule. The leader can stop the formation if it detects an obstacle. This is achieved by an emergency stop (E_STOP) message which is broadcast in the downlink. The follower robots can also piggyback information pertaining to obstacle detection on the uplink information being exchanged over the group communication schedule. Based on the received uplink information from any of the follower robots, the leader broadcasts an E_STOP message if it apprehends an obstacle colliding with the formation.

Figure 14:
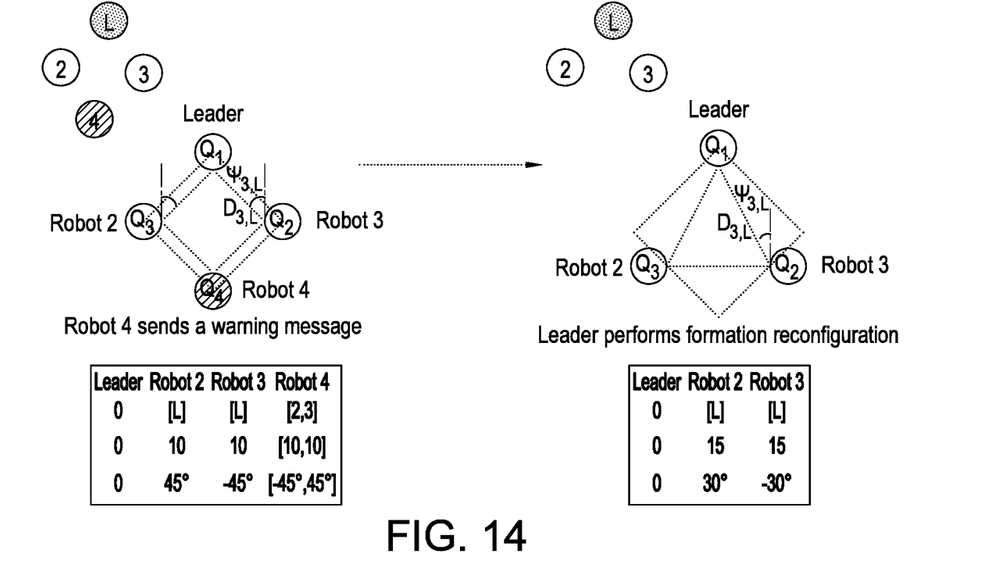
FIG. 14 illustrates a process for formation reconfiguration following loss of a robot.

It is possible that a robot fails during collective transport. In one embodiment, this could be any of the follower robots. All robots are configured to send a warning signal (instead of a K_ALIVE message) to the leader robot if it detects an issue that may lead to a failure during collective transport. Upon receipt of the warning message the leader robot broadcasts an E_STOP message to all followers. The robots stop and disengage the lifting mechanism in a synchronous manner. The robot sending the warning signal is taken out of service and a formation reconfiguration procedure is triggered by the leader. The reconfiguration procedure entails a suitable new formation for carrying the platform. The leader robot generates a new geometry matrix as well as a new reference matrix pertaining to the new shape. This is illustrated in FIG. 14. Whilst this figure illustrates a re-configuration the robots in a geometry that requires one robot fewer than the originally participating number of robots, the leader robot can also advertise an emergence request to recruit a new follower robot to replace the failed robot in the current or a different formation. The request for new follower contains position information for the new robot, the reference robot(s) and the desired distance and orientation information.

Alternatively, if the leader robot fails during collective transport, it sends a warning signal to the followers and selects one of the follower robots as the new leader robot. The new leader robot triggers the aforementioned reconfiguration procedure or it broadcasts an emergency request for a new follower robot to replace the old leader (as a follower).

Embodiments discussed above consider energy cost of tasks to be performed during follower selection process. This balances energy consumption across the network and potentially maximizes network lifetime.

Embodiments described herein moreover facilitate simultaneous operation of multiple formations in different parts of the logistic facility.

Stable formation synthesis from any initial state of robots is moreover facilitated.

Group communication on fine timescale can ensure stability of the formation during collective transport.

The framework described herein moreover provides formation reconfiguration capabilities in case of robot failures.

In one embodiment the robots are configured to perform their allocated transport tasks solely based on origin and target location information received from a central unit and on sensing information acquired by one or more of the robots that form part of the group of robots allocated to a transport task. Put in other words, in the embodiment the group of robots does not need to receive any position or movement information from the central unit beyond the information of the two locations between which the transport task has to be performed. The robots therefore do not need to rely on global knowledge of the environment in which they operate or on a global coordinate system or on any type of infrastructure support provided by a centralised management system. The robots are in constant communication with each other during the transport task so that sensing information acquired by one robot that may not be available to one or more other robots in the group (say because the robot's sensor(s) are obscured) is communicated within the group.

In the embodiment robots make decisions pertaining to formation synthesis and control in a decentralized/distributed manner.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method performed in a system including at least a first vehicle, a second vehicle, and a third vehicle, the method comprising:
receiving, from a sensor, by the first vehicle, information to identify a platform loaded with an object from platforms, the platforms corresponding to to-be-loaded objects having different sizes and weights;
determining, by the first vehicle, a formation formed by vehicles to perform a transport operation based on the information, the formation forming a planar polygon, the vehicles being arranged on vertices of the planar polygon, the vehicles including at least the first vehicle, the second vehicle, and the third vehicle, the transport operation indicating transporting the object from one point to another point, the platform being transported by the vehicles;

generating, by the first vehicle, geometric configuration information indicating the formation for carrying the object, the formation being maintained during the transport operation;

transmitting, by the first vehicle, the geometric configuration information, wherein the geometric configuration information includes first geometric information and second geometric information, the first geometric information regarding a first distance and a first orientation relative to the first vehicle, the second geometric information regarding a second distance and a second orientation relative to the first vehicle;

receiving, by the vehicles, the geometric configuration information;

adopting, by the second vehicle, a first position relative to the first vehicle, the first position of the second vehicle being defined by the first distance and the first orientation relative to the first vehicle, the second vehicle participating in the transport operation in combination with the first vehicle and the third vehicle, the first distance and the first orientation being adopted by the second vehicle;

adopting, by the third vehicle, a second position relative to the first vehicle, the second position of the third vehicle being defined by the second distance and the second orientation relative to the first vehicle, the third vehicle participating in the transport operation in combination with the first vehicle and the second vehicle, the second distance and the second orientation being adopted by the third vehicle; and performing, by the first vehicle, the second vehicle, and the third vehicle, the transport operation in a synchronised manner once the second vehicle and the third vehicle have adopted the first position and the second position.

2. The method as claimed in claim 1, wherein the second vehicle, based upon the geometric configuration information, returns second information to the first vehicle, the second information indicating at least one of: a distance of the second vehicle to a location identified in the geometric configuration information, or an amount of energy available to the second vehicle; and
  wherein the first vehicle assigns the second vehicle to the location based on the returned second information.

3. The method as claimed in claim 1, wherein the second vehicle, based upon the geometric configuration information, assigns itself to a location identified in the geometric configuration information based on at least one of: a distance of the second vehicle to the location, an amount of energy available to the second vehicle, or an estimated amount of energy required for the transport operation.

4. The method as claimed in claim 1, wherein throughout the transport operation the first vehicle transmits movement information to the second vehicle and the third vehicle participating in the transport operation, the movement information indicating a next movement required to be performed by the second vehicle and the third vehicle, the movement information being such that relative positions of vehicles participating in the transport operation are maintained whilst the vehicles perform the next movement.

5. The method as claimed in claim 4, wherein the movement information includes a velocity to be adopted by the vehicles, and wherein the vehicles feed a current velocity back to the first vehicle.

6. The method as claimed in claim 1, wherein at least one of the first vehicle, the second vehicle, or the third vehicle participating in the transport operation includes a sensor or sensors for sensing one or more environmental conditions and a transmit function for communicating a sensed environmental condition to other vehicles participating in the transport operation.

7. The method as claimed in claim 5, wherein the first vehicle stops or pauses the transport operation upon receipt of information from at least one of the second vehicle or the third vehicle participating in the transport operation indicating an environmental condition detrimental to continuing the transport operation.

8. The method as claimed in claim 1, wherein, upon receipt of information indicating that a vehicle that had previously participated in the transport operation is not able to complete the transport operation, the first vehicle either:
  instructs remaining vehicles participating in the transport operation to adopt a geometric configuration suitable for completion of the transport operation and requiring a reduced number of vehicles; or
  recruits a replacement vehicle for participation in the transport operation.

9. The method as claimed in claim 1, wherein the first vehicle, the second vehicle, and the third vehicle participating in the transport operation communicate using a transmission schedule of timeslots on distinct frequency channels based on handshakes between the first vehicle and the second vehicle participating in the transport operation and based on handshakes between the first vehicle and the third vehicle participating in the transport operation.

10. The method as claimed in claim 1, wherein a vehicle participating in the transport operation selects another vehicle participating in the transport operation as a reference vehicle for maintaining a formation indicated by the geometric configuration information, wherein the another vehicle is selected based on information received from other vehicles participating in the transport operation.

11. The method as claimed in claim 1, wherein the first vehicle, the second vehicle, and the third vehicle are provided to transport the platform from the one point to the another point, the object being placed on the platform.

12. A system, comprising:
  a first vehicle configured to:
    receive, from a sensor, information to identify a platform loaded with an object from platforms, the platforms corresponding to to-be-loaded objects having different sizes and weights,
    determine a formation formed by vehicles to perform a transport operation based on the information, the formation forming a planar polygon, the vehicles being arranged on vertices of the planar polygon, the transport operation indicating transporting the object from one point to another point, the platform being transported by the vehicles,
    generate geometric configuration information indicating the formation for carrying the object, the formation being maintained during the transport operation,
    transmit the geometric configuration information, wherein the geometric configuration information includes first geometric information and second geometric information, the first geometric information regarding a first distance and a first orientation relative to the first vehicle, the second geometric information regarding a second distance and a second orientation relative to the first vehicle;
  a second vehicle configured to:
    receive the geometric configuration information, and
    adopt a first position relative to the first vehicle, the first position of the second vehicle being defined by the first distance and the first orientation relative to the first vehicle, the second vehicle participating in the transport operation in combination with the first vehicle and a third vehicle, the first distance and the first orientation being adopted by the second vehicle; and the third vehicle configured to:
receive the geometric configuration information; and
adopt a second position relative to the first vehicle, the second position of the third vehicle being defined by the second distance and the second orientation relative to the first vehicle, the third vehicle participating in the transport operation in combination with the first vehicle and the second vehicle, the second distance and the second orientation being adopted by the third vehicle, wherein the first vehicle, the second vehicle, and the third vehicle are configured to perform the transport operation in a synchronised manner once the second vehicle and the third vehicle have adopted the first position and the second position, and the vehicles includes at least the first vehicle, the second vehicle, and the third vehicle.

13. The system as claimed in claim 12, wherein the second vehicle is configured to, based upon the geometric configuration information, return second information to the first vehicle, the second information indicating at least one of: a distance of the second vehicle to a location identified in the geometric configuration information, or an amount of energy available to the second vehicle; and
wherein the first vehicle is configured to assign the second vehicle to the location based on the returned second information.

14. The system as claimed in claim 12, wherein the second vehicle is configured to, based upon the geometric configuration information, assign itself to a location identified in the geometric configuration information based on at least one of: a distance of the second vehicle to the location, an amount of energy available to the second vehicle, or an estimated amount of energy required for the transport operation.

15. The system as claimed in claim 12, wherein the first vehicle is configured to transmit, throughout the transport operation, movement information to the second vehicle and the third vehicle participating in the transport operation, the movement information indicating a next movement required to be performed by the second vehicle and the third vehicle, the movement information being such that relative positions of vehicles participating in the transport operation are maintained whilst the vehicles perform the next movement.

16. The system as claimed in claim 12, wherein at least one of the first vehicle, the second vehicle, or the third vehicle participating in the transport operation includes a sensor or sensors for sensing one or more environmental conditions and a transmit function for communicating a sensed environmental condition to other vehicles participating in the transport operation.

17. The system as claimed in claim 16, wherein the first vehicle is configured to stop or pause the transport operation upon receipt of information from at least one of the second vehicle or the third vehicle participating in the transport operation indicating an environmental condition detrimental to continuing the transport operation.

18. The system as claimed in claim 12, wherein the first vehicle is configured to, upon receipt of information indi-cating that a vehicle that had previously participated in the transport operation is not able to complete the transport operation, either:
instruct remaining vehicles participating in the transport operation to adopt a geometric configuration suitable for completion of the transport operation and requiring a reduced number of vehicles; or recruit a replacement vehicle for participation in the transport operation.

19. The system as claimed in claim 12, wherein the first vehicle, the second vehicle, and the third vehicle participating in the transport operation communicate using a transmission schedule consisting of timeslots on distinct frequency channels based on handshakes between the first vehicle and the second vehicle participating in the transport operation and based on handshakes between the first vehicle and the third vehicle participating in the transport operation.

20. The system as claimed in claim 12, wherein a vehicle participating in the transport operation selects another vehicle participating in the transport operation as a reference vehicle for maintaining the formation indicated by the geometric configuration information, wherein the another vehicle is selected based on information received from other vehicles participating in the transport operation.

21. The system as claimed in claim 12, wherein the second vehicle is configured to, based upon the geometric configuration information, return second information to the first vehicle, the second information indicating at least one of an amount of energy available to the second vehicle, or an estimated amount of energy required for the transport operation, and
wherein the first vehicle is configured to assign the second vehicle to a location identified in the geometric configuration information based on the returned second information.

22. The system as claimed in claim 15, wherein the movement information includes a velocity to be adopted by the vehicles and wherein the vehicles feed a current velocity back to the first vehicle.

23. An autonomous vehicle configured to:
receive, from a sensor, information to identify a platform loaded with an object from platforms, the platforms corresponding to to-be-loaded objects having different sizes and weights,
determine a formation formed by vehicles to perform a transport operation based on the information, the formation forming a planar polygon, the vehicles being arranged on vertices of the planar polygon, the vehicles including at least the autonomous vehicle, a first vehicle, and a second vehicle, the transport operation indicating transporting the object from one point to another point, the platform being transported by the vehicles;
generate geometric configuration information indicating the formation for carrying the object, the formation being maintained during the transport operation; and
transmit the geometric configuration information to be adopted by the first vehicle and the second vehicle participating in the transport operation in combination with the autonomous vehicle, wherein the geometric configuration information includes first geometric information and second geometric information, the first geometric information regarding a first distance and a first orientation relative to the autonomous vehicle, the second geometric information regarding a second distance and a second orientation relative to the autonomous vehicle, the first distance and the first orientation being adopted by the first vehicle, the second distance and the second orientation being adopted by the second vehicle, wherein the autonomous vehicle, the first vehicle, and the second vehicle are configured to perform the transport operation in a synchronised manner once the first vehicle has adopted a first position defined by the first distance and the first orientation, and the second vehicle has adopted a second position defined by the second distance and the second orientation.

* * * * *